(12) United States Patent
Zeng

(10) Patent No.: US 10,923,728 B1
(45) Date of Patent: Feb. 16, 2021

(54) CURRENT COLLECTOR STRUCTURES FOR RECHARGEABLE BATTERY

(71) Applicant: Apple Inc., Cupertino, CA (US)

(72) Inventor: Qingcheng Zeng, San Jose, CA (US)

( * ) Notice: Subject to any disclaimer, the term of this patent is extended or adjusted under 35 U.S.C. 154(b) by 134 days.

(21) Appl. No.: 16/007,534

(22) Filed: Jun. 13, 2018

Related U.S. Application Data

(60) Provisional application No. 62/520,740, filed on Jun. 16, 2017.

(51) Int. Cl.
*H01M 4/66* (2006.01)
*H01M 4/75* (2006.01)

(52) U.S. Cl.
CPC ........... *H01M 4/668* (2013.01); *H01M 4/661* (2013.01); *H01M 4/666* (2013.01); *H01M 4/75* (2013.01)

(58) Field of Classification Search
None
See application file for complete search history.

(56) References Cited

U.S. PATENT DOCUMENTS

| | | | |
|---|---|---|---|
| 4,374,186 A | 2/1983 | McCartney et al. | |
| 4,567,119 A | 1/1986 | Lim | |
| 5,162,172 A | 11/1992 | Kaun | |
| 5,254,415 A | 10/1993 | Williams et al. | |
| 5,367,431 A | 11/1994 | Kunishi et al. | |
| 8,357,469 B2 | 1/2013 | Shaffer et al. | |
| 9,142,811 B2 | 9/2015 | Chami | |
| 2002/0146620 A1 | 10/2002 | Connell | |
| 2003/0027051 A1* | 2/2003 | Kejha | H01G 9/155 429/233 |
| 2005/0106456 A1 | 5/2005 | Puester et al. | |
| 2009/0068531 A1 | 3/2009 | Sawa et al. | |
| 2009/0136832 A1 | 5/2009 | Aihara et al. | |
| 2009/0233175 A1* | 9/2009 | Kelley | H01M 2/32 429/225 |
| 2010/0134942 A1 | 6/2010 | Wang et al. | |
| 2011/0294007 A1 | 12/2011 | Hosaka et al. | |
| 2012/0156552 A1 | 6/2012 | Miyazaki et al. | |

(Continued)

FOREIGN PATENT DOCUMENTS

| CN | 101809801 A | 8/2010 |
|---|---|---|
| CN | 102272977 A | 12/2011 |

(Continued)

OTHER PUBLICATIONS

Europe Patent Application No. 16738994.9, "Communication Pursuant to Rules 161(1) and 162 EPC", dated Mar. 23, 2018, 3 pages.

(Continued)

*Primary Examiner* — Wojciech Haske
(74) *Attorney, Agent, or Firm* — Kilpatrick Townsend & Stockton

(57) ABSTRACT

Energy storage devices, battery cells, and batteries of the present technology include a current collector including a polymer film coupled with a plurality of wires of a metal-containing material. The current collector may include a first region and a second region. The first region may be characterized by an extension of the metal-containing material. The polymer film may be contained within the second region of the current collector. Additionally, the plurality of wires may extend from the extension of the metal-containing material along the polymer film.

18 Claims, 7 Drawing Sheets

(56) References Cited

U.S. PATENT DOCUMENTS

| | | | |
|---|---|---|---|
| 2012/0189896 | A1 | 7/2012 | Zhou et al. |
| 2013/0065106 | A1 | 3/2013 | Faust et al. |
| 2015/0325894 | A1 | 11/2015 | Merriman et al. |
| 2016/0049679 | A1 | 2/2016 | Stevens et al. |
| 2016/0099456 | A1 | 4/2016 | Kwon et al. |
| 2016/0111729 | A1* | 4/2016 | Kim ............... H01M 4/525 429/235 |
| 2016/0197352 | A1 | 7/2016 | Blaser et al. |
| 2016/0248113 | A1 | 8/2016 | He et al. |
| 2017/0214057 | A1 | 7/2017 | Kotik et al. |
| 2018/0226654 | A1 | 8/2018 | Ohsawa et al. |

FOREIGN PATENT DOCUMENTS

| | | | |
|---|---|---|---|
| CN | 103165920 | A | 6/2013 |
| CN | 103222098 | A | 7/2013 |
| CN | 103548196 | A | 1/2014 |
| CN | 103904294 | A | 7/2014 |
| CN | 107851747 | A | 3/2018 |
| EP | 2892097 | A1 | 7/2015 |
| EP | 3317907 | A | 5/2018 |
| JP | 06503442 | A | 4/1994 |
| JP | 2005005163 | A | 1/2005 |
| JP | 2006012556 | A | 1/2006 |
| JP | 2007012584 | A | 1/2007 |
| JP | 2011071011 | A | 4/2011 |
| JP | 4857710 | B2 | 1/2012 |
| JP | 2012234823 | A | 11/2012 |
| JP | 2013114746 | A | 6/2013 |
| JP | 2013187074 | A | 9/2013 |
| JP | 5410822 | B2 | 2/2014 |
| JP | 2014029818 | A | 2/2014 |
| JP | 2018519646 | | 7/2018 |
| KR | 20130066795 | A | 6/2013 |
| WO | 8504287 | A1 | 9/1985 |
| WO | 9210861 | A1 | 6/1992 |
| WO | 2016031689 | A1 | 3/2016 |
| WO | 2017007827 | | 1/2017 |
| WO | 2017007827 | A1 | 1/2017 |
| WO | 2018057566 | A1 | 3/2018 |
| WO | 2018195372 | A1 | 10/2018 |
| WO | 2018213601 | A2 | 11/2018 |

OTHER PUBLICATIONS

Japan Patent Application No. 2018-500449, "Office Action", dated Jan. 21, 2019, 12 pages.
PCT/US2016/041151, "International Preliminary Report on Patentability", dated Jan. 18, 2018, 8 pages.
PCT/US2016/041151, "International Search Report and Written Opinion", dated Aug. 25, 2016, 10 pages.
PCT/US2017/052413, "International Search Report and Written Opinion", dated Feb. 1, 2018, 19 pages.
PCT/US2017/052413, "Invitation to Pay Additional Fees", dated Dec. 8, 2017, 14 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
Korean Patent Application No. 10-2018-7000263, "Office Action", dated Feb. 28, 2019, 5 pages.
Korea Patent Application No. 10-2018-7000263, "Office Action", dated Sep. 27, 2019, 16 pages.
PCT/US2018/028472, "International Preliminary Report on Patentability", dated Oct. 31, 2019, 10 pages.
U.S. Appl. No. 15/742,009, "Restriction Requirement", dated Jun. 11, 2019, 8 pages.
U.S. Appl. No. 15/742,009, "Non-Final Office Action", dated Nov. 15, 2019, 14 pages.
Japan Patent Appl. No. 2018-500449, "Notice of Decision to Grant", dated Nov. 18, 2019, 2 pages.
PCT/US2018/033218, "International Preliminary Report on Patentability", dated Nov. 28, 2019, 9 pages.
U.S. Appl. No. 16/049,250, "Non-Final Office Action", dated Apr. 8, 2020, 8 pages.
U.S. Appl. No. 15/962,133, "Non-Final Office Action", dated Jan. 21, 2020, 37 pages.
Chinese Patent Application No. 201680039891.9, "Office Action", dated Jan. 6, 2020, 21 pages.
International Patent Application No. PCT/US2017/052413, "International Preliminary Report on Patentability", dated Apr. 4, 2019, 12 pages.
U.S. Appl. No. 16/263,890, "Non-Final Office Action", dated Jun. 16, 2020, 9 pages.
Chinese Patent Application No. 201680039891.9, "Office Action", dated Jun. 10, 2020, 18 pages.
U.S. Appl. No. 15/962,133, "Final Office Action", dated Jul. 7, 2020, 23 pages.
U.S. Appl. No. 15/742,009, "Final Office Action", dated Aug. 19, 2020, 13 pages.
U.S. Appl. No. 16/108,522, "Non-Final Office Action", dated Sep. 9, 2020, 10 pages.
European Patent Application No. 16738994.9, "Notice of Decision to Grant", dated Sep. 24, 2020, 2 pages.
U.S. Appl. No. 16/108,498, "Non-Final Office Action", dated Apr. 30, 2020, 28 pages.
U.S. Appl. No. 16/273,625, "Non-Final Office Action", dated May 4, 2020, 54 pages.
Korean Patent Application No. 10-2018-7000263, "Notice of Decision to Grant", dated Apr. 8, 2020, 2 pages.

* cited by examiner

CURRENT COLLECTOR STRUCTURES FOR RECHARGEABLE BATTERY

CROSS REFERENCE TO RELATED APPLICATION

This application claims the benefit of U.S. Provisional Application No. 62/520,740, filed Jun. 16, 2017, the entire disclosure of which is hereby incorporated by reference for all purposes.

TECHNICAL FIELD

The present technology relates to batteries and battery components. More specifically, the present technology relates to current collector structures and uses.

BACKGROUND

In battery-powered devices, batteries are sometimes connected to electronic circuits through one or more fuses. Fuse performance can impact the overall performance of the battery-powered device.

SUMMARY

The present technology relates to energy storage devices, including battery cells and batteries, that include a fusing element associated with a current collector of the cell. These fusing elements may enable improved end-of-life capabilities of the energy storage devices, and may provide safer operating parameters. The fusing elements may include both metal-based fusing elements and polymer based fusing elements as will be described throughout the disclosure.

Energy storage devices, battery cells, and batteries of the present technology may include a current collector including a polymer film coupled with a plurality of wires of a metal-containing material. The current collector may include a first region and a second region. The first region may be characterized by an extension of the metal-containing material. The polymer film may be contained within the second region of the current collector. Additionally, the plurality of wires may extend from the extension of the metal-containing material along the polymer film.

In some embodiments, the plurality of wires of the metal-containing material may extend across a first surface of the polymer film. The plurality of wires may be a first plurality of wires, and the current collector may also include a second plurality of wires extending from the extension of the metal-containing material along a second surface of the polymer film opposite the first surface of the polymer film. The second plurality of wires may be laterally offset from the first plurality of wires. The polymer film may be at least partially contained between the first plurality of wires and the second plurality of wires. The polymer film may at least partially extend about the plurality of wires. The polymer film may include a conductive polymer film. In embodiments, the battery cell may further include an electrode active material positioned along the plurality of wires within the second region of the current collector. The electrode active material may at least partially extend within the plurality of wires to contact the polymer film. An inter-wire distance may be less than or equal to a thickness of the active material. Each wire of the plurality of wires may be characterized by a nonlinear profile from the extension of the metal-containing material along the polymer film.

The present technology also encompasses batteries. The batteries may include a first current collector including a polymer film coupled with a plurality of wires of a metal-containing material. The batteries may include a first active material coupled with the first current collector. The batteries may include a second current collector. The batteries may also include a second active material coupled with the second current collector.

In some embodiments, the second current collector may include a metal foil. The plurality of wires of the metal-containing material may include a first metal-containing material. The second current collector may include a second polymer film coupled with a plurality of wires of a second metal-containing material. The plurality of wires of the first metal-containing material may be positioned along a surface of the polymer film facing the second current collector. The first current collector and the second current collector may be components of a first battery cell within the batteries, and the batteries may further include a second battery cell having a third current collector proximate the first current collector. The polymer film of the first current collector may include a first polymer film, and the third current collector may include a second polymer film coupled with a plurality of wires of a second metal-containing material. The plurality of wires of the second metal-containing material may be positioned along a first surface of the second polymer film, and the plurality of wires of the first current collector may be positioned along a first surface of the first polymer film. The first polymer film and the second polymer film may each include a second surface opposite the first surface, and the second surface of the first polymer film and the second surface of the second polymer film may be adjacent one another.

The present technology also encompasses electrodes for battery cells. The electrodes may include a current collector including conductive particles associated with a polymer film. The current collector may include a first region and a second region. The first region may be characterized by an extension of a metal-containing material. The polymer film may be contained within the second region of the current collector. The conductive particles may be contained within the second region of the current collector. In some embodiments, the conductive particles may include a polymer core at least partially contained within a conductive shell. The conductive particles may be substantially uniformly distributed within the polymer film. The conductive particles may also be positioned as filaments along a surface of the polymer film.

Such technology may provide numerous benefits over conventional technology. For example, the present devices may help preserve structural integrity by disrupting current flow through the device. Additionally, the improved fuse designs can be applied to a number of cell structures and situations providing a heat-based safety feature that can protect individual cells or coupled cells from damage. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
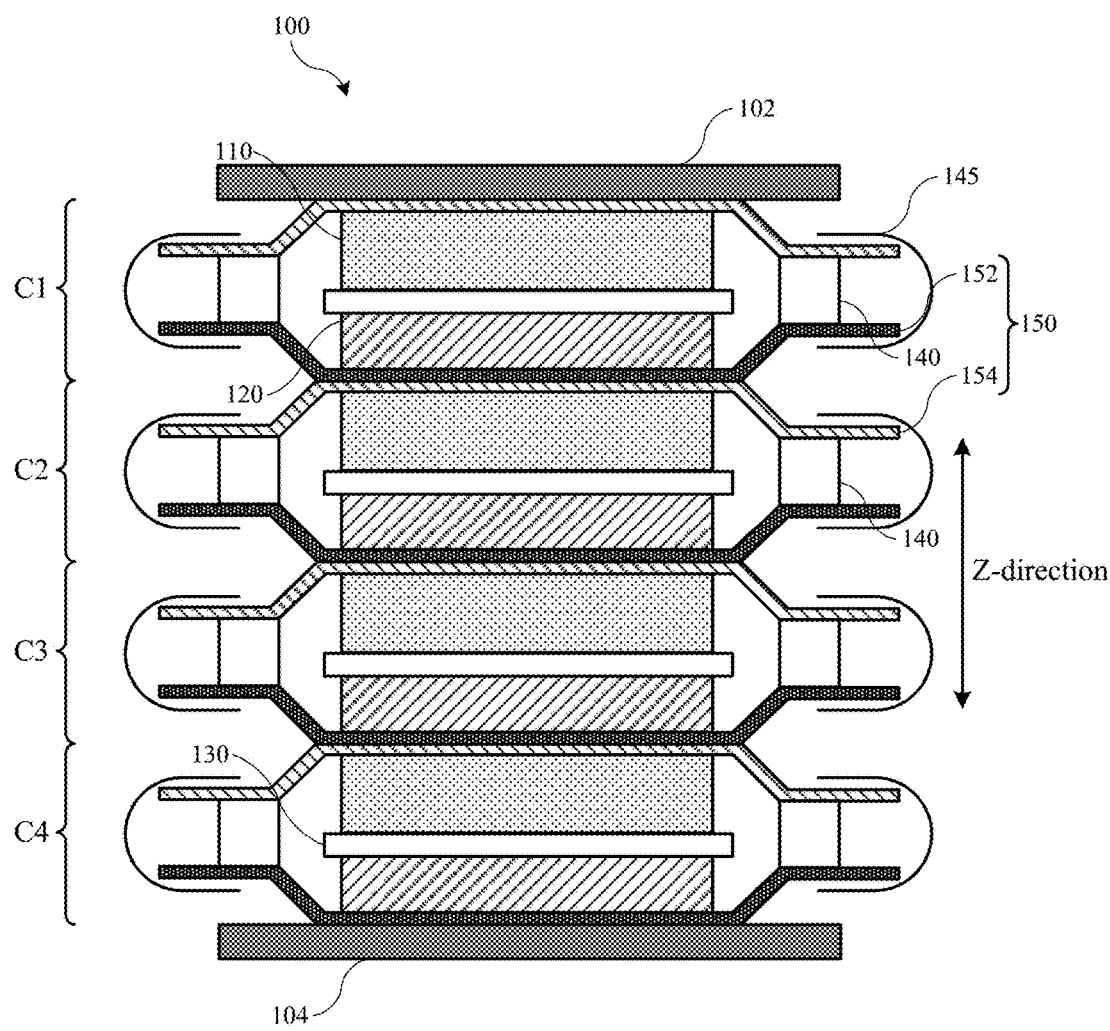
FIG. 1 shows a schematic cross-sectional view of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a host of materials. These devices may include one or more safety features including a fuse, for example, that may protect the devices from battery issues or other failures. Fuses may be resettable or non-resettable in different designs. Resettable fuses may be used to protect against events including momentary current surges that may damage the device if allowed to persist, but are not necessarily indicative of a faulty battery. Non-resettable fuses may be used in numerous designs to protect against more permanent failure conditions such as electrical shorts.

A fuse may be located in a variety of positions within the battery, but is often located in the electrical couplings between the cell and the terminals. Conventional battery designs, such as for lithium-ion batteries, routinely locate the fuse external to a cell along tabs or other components coupling cells to a current source. When an electrical short or other fault occurs within the device, coupled cells may still be coupled together despite that the fuse disrupts additional current flow into the battery. Although additional current may not enter the cell, heat generated from the event may continue to cause electrical or heat generation issues that may be transferred from one cell to another within the device. As the issues persist, exothermic reactions may also occur that transfer heat from one cell to another, propagating the issue across multiple cells of the battery.

The present technology overcomes these issues by utilizing improved fuse and battery designs. By locating fuses within the battery cells themselves, heat generation issues may be halted from propagating between cells, and may be interrupted prior to generating sufficient heat to cause further breakdown. The fusing components and locations may include current collector designs with fusing functionalities, which may be applied to any battery cell design, and may provide additional advantages to designs including multiple cells, which may otherwise allow heat generation and conduction across cells of the battery.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
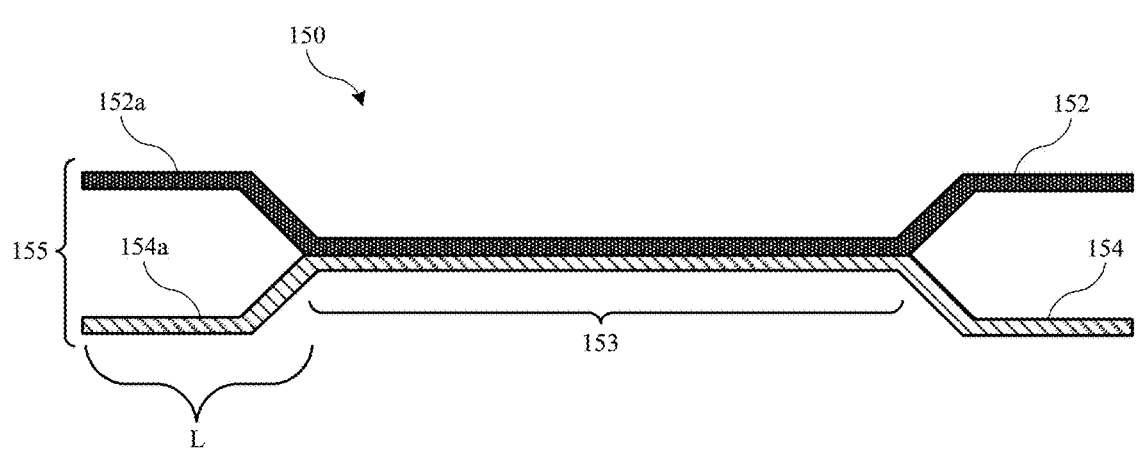
FIG. 2 shows a schematic cross-sectional view of a current collector according to embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152a and 154a may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^{-4}$ ohm-m in embodiments. Additionally, exemplary current collectors may have an in-plane and through-plane resistivity of between about $1 \times 10^{-3}$ ohm-m and about 1,000 ohm-m. In other embodiments, more conventional electrical distribution may be employed, where current is transferred along conductive current collectors into and out of the cell.

Figure 3:
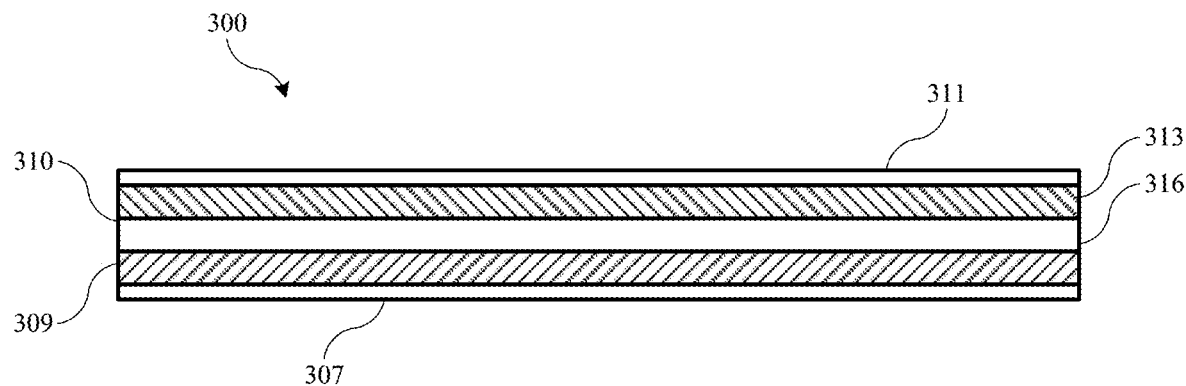
FIG. 3 shows a cross-sectional view of an energy storage device according to embodiments of the present technology.

The present technology may also be applicable in other cell designs utilizing xy-plane current transfer. Turning to FIG. 3 is shown a schematic view of an energy storage device 300 according to embodiments of the present technology. Energy storage device 300 may be a battery cell or may be a composite battery. Energy storage device 300 may be characterized by a number of structural configurations including a cylindrical cell design, a jelly roll design, a pouch design, or a prismatic design, for example. As illustrated, energy storage device 300 may include battery cell material 310, which may be a jelly roll or layers of material stacked or overlapped in various configurations. The cell material 310 may be electrode materials for an anode and cathode of an electrochemical cell. As would be readily understood, the layers are not shown at any particular scale, and are intended merely to show the possible layers of cell material 310. As illustrated, cell material 310 may include a cathode current collector 307, which may be coupled with a cathode electrode material 309. In embodiments, cathode current collector 307 may be aluminum, and may also be alternative metals or conductive materials that may be stable at potentials above about 3 V, for example. Cathode current collector 307 may be coated or coupled with a cathode active material 309, which may include a lithium-containing compound in embodiments.

Cell material 310 may also include an anode current collector 311, which may be coupled with an anode electrode material 313. Anode current collector 311 may be copper in embodiments, and may also be alternative metals or conductive materials that may be stable at potentials below about 1 V, for example. Anode current collector 311 may be coated or coupled with anode active material 313, which may include a carbon-containing compound in embodiments. A separator 316 may be disposed between the electrodes, and may be a polymer film or a material that may allow lithium ions to pass through its structure while not otherwise conducting electricity.

Although illustrated as single layers of electrode material, cell material 310 may be any number of layers. Although the cell may be composed of one layer each of anode and cathode material as sheets, the layers may also be formed into a jelly roll design, or folded design, such that any number of layers may be included in cell material 310. For embodiments which include multiple layers, the tab portions of each anode current collector may be coupled together, as may be the tab portions of each cathode current collector.

Figure 4:
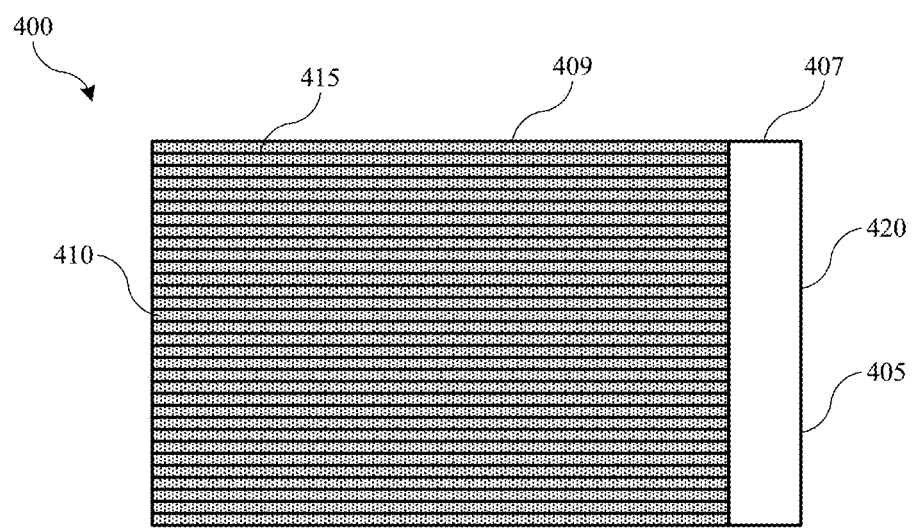
FIG. 4 shows a schematic plan view of an electrode according to embodiments of the present technology.

Turning to FIG. 4 is shown a schematic top plan view of a portion of an electrode 400 according to embodiments of the present technology. Electrode 400 may be incorporated in any of the cells discussed with respect to FIGS. 1 and 3, and may be used as either a cathode or anode current collector in embodiments. Electrode 400 may be characterized by materials configured to operate as fusing elements within the electrode, which may be capable of interrupting current flow across the electrode during a shorting event, breaching event, or other event associated with a cell fault or failure. In some embodiments both electrode structures may be include a structure similar to electrode 400, while in other embodiments one electrode may be similar to electrode 400, while a second electrode of a battery cell may utilize a metal foil as a current collector of the electrode.

As illustrated, electrode 400 may include current collector 405, which may be any of current collectors 152, 154, 307, or 309 discussed previously. Current collector 405 may include a polymer film 410 that is associated with, coupled with, or contacted by a plurality of wires 415 of a conductive material. Current collector 405 may be characterized by multiple regions, and may include a first region 407 and a second region 409. First region 407 of current collector 405 may be associated with an end region of the current collector, and may be characterized by an extension 420 of the conductive material included with wires 415, or some other conductive material. The second region 409 of current collector 405 may contain the polymer film 410, as well as wires 415. The plurality of wires 415 may extend from the extension 420 of the conductive material, and may extend along the polymer film 410.

When current above a threshold is delivered or received through a cell, either from a fault, short, or other electrical event, one or more of the wires 415 may be heated based on the increased current. The heat may increase to a point at which the wires associated with the increased current reach their melting point based on the size and composition of the wires. This melting may operate as a fuse within the current collector, which may protect other cells or components of the battery, as well as the device in which the battery is housed, from damage associated with the electrical event. Similarly, polymer film 410 may be configured to melt at a particular temperature, which may additionally assist in the fusing operation by flowing between broken or fused wires, or flowing towards first region 407, which may increase resistance or in some embodiments interrupt current flow between cells, current collectors, or other components of the battery.

The polymer film 410 may be or include any of the polymeric materials previously described, and may include thermoplastic or other polymers, which may include polypropylene, polyethylene, polyisobutylene, or a variety of other polymeric materials. The polymer film may be characterized by a variety of thicknesses, which may be up to or about 5 µm, or greater than or about 3 µm, greater than or about 5 µm, greater than or about 7 µm, greater than or about 10 µm, greater than or about 15 µm, greater than or about 20 µm, greater than or about 25 µm, greater than or about 30 µm, greater than or about 35 µm, greater than or about 40 µm, greater than or about 50 µm, greater than or about 60 µm, greater than or about 70 µm, greater than or about 80 µm, greater than or about 90 µm, greater than or about 100 µm, greater than or about 125 µm, greater than or about 150 µm, greater than or about 200 µm, or greater. The thickness may also be any smaller range encompassed within any of these ranges. The thickness may be based at least in part on the cell dimensions in embodiments.

Figure 5:
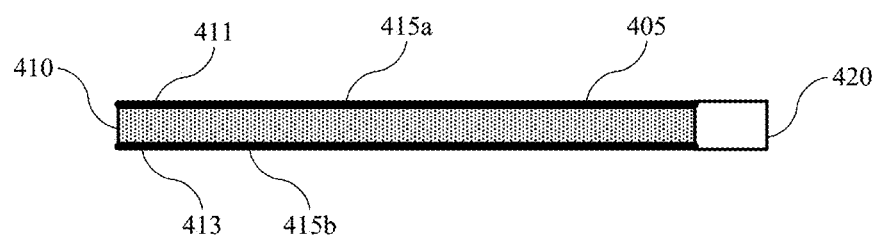
FIG. 5 shows a schematic side view of an electrode according to embodiments of the present technology.

FIG. 5 shows a schematic side view of an electrode 400 according to embodiments of the present technology, and may show a side view of current collector 405. As shown in the figure, polymer film 410 may be positioned adjacent extension 420, and may be contacted by wires 415, which may extend across a first surface 411 of the polymer film 410. In some embodiments, the plurality of wires 415 may be a first plurality of wires 415a. In some embodiments, the current collector 405 may also include a second plurality of wires 415b. The second plurality of wires 415b may also extend from extension 420 of current collector 405. As illustrated, the second plurality of wires 415b may extend along a second surface 413 of the polymer film 410. The second surface 413 of the polymer film 410 may be opposite the first surface 411 of polymer film 410. In this configuration, the polymer film may be at least partially contained between the first plurality of wires 415a and the second plurality of wires 415b. Both sets of wires 415 may contact polymer film 410 along a length of the wire.

The extension 420 of conductive material may be an exterior region of the current collector 405. Current collector 405 may also have additional regions beyond first region 407 and second region 409 in embodiments. For example, current collector 405 may be further characterized by a third region on a side of the polymer material opposite a side contacting the extension 420 of conductive material. This third region may also include an extension of conductive material similar to extension 420. Additional regions of solid conductive material may also be disposed about other sides of the second region 409 in other embodiments.

Extension 420 may be operable as an end region of a current collector in various embodiments. For example, in stacked or rolled battery configurations such as illustrated in FIG. 3, current may be delivered to cells and received from cells via tabs on the current collectors. As noted previously, such configurations may operate with current flow in an xy-direction along each current collector. Multiple cells may be configured by having current collectors of the same potential coupled with one another, such as, for example, having each of the anode current collectors coupled together, and each of the cathode current collectors coupled together. Current may then be distributed from these tab regions across the current collector to deliver and receive electrons during operation of the battery cell. Tab regions may be coupled with, or may be part of, extension 420. For example, extension 420 may have a formed tab as part of the extension shape, or a tab may be coupled with the extension, which may allow a different material to be used as the tab, and which may be coupled to extension 420. By utilizing an extension to which each of the wires 415 is coupled, a more uniform flow of current may be delivered across the current collector 405, and to an associated active material. This may help prevent hot spots and other irregularities in current delivery and operation, which may degrade the cell over time.

Figure 6A:
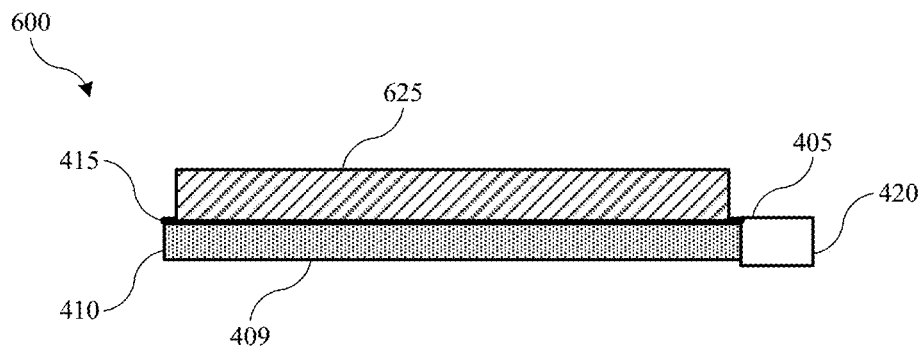
FIGS. 6A-6C show schematic views of an electrode according to embodiments of the present technology.
Figure 6B:
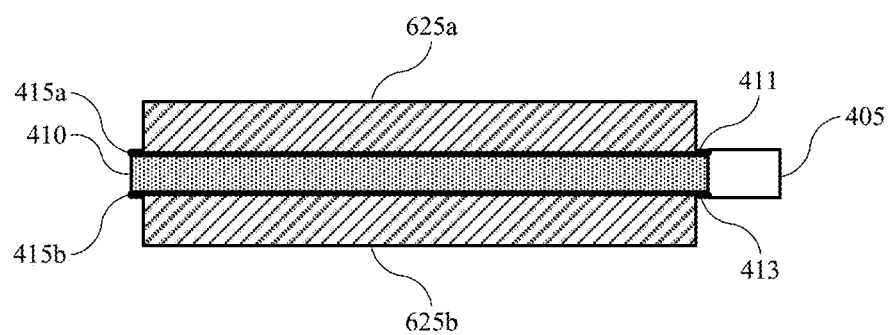
Figure 6C:
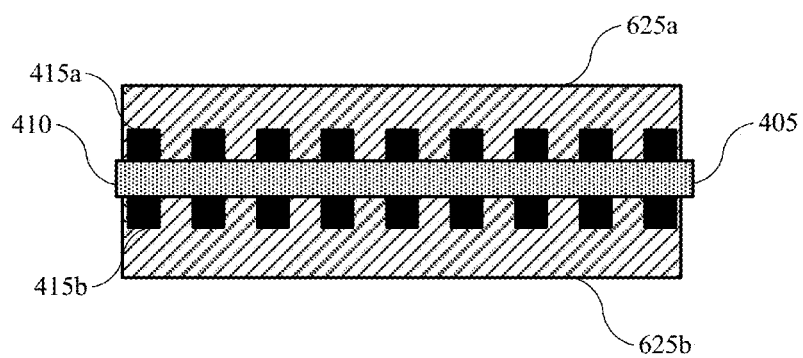

As may be incorporated within a battery cell, current collector 405 may be associated with an electrode material, which may be disposed on one or more surfaces of the current collector 405. FIGS. 6A-6C show schematic views of an electrode 600 according to embodiments of the present technology. As shown in FIG. 6A, electrode 600 may include current collector 405 as previously described, which may include an extension 420, wires 415 along a surface of the current collector, and polymer film 410. Electrode 600 may also include an active material 625 disposed adjacent current collector 405. Active material 625 may be positioned along the plurality of wires 415 within the second region 409 of the current collector 405. In embodiments, the active material may extend to, towards, or on to extension 420, but in some embodiments as illustrated the active material 625 may be maintained within second region 409 of the current collector. The active material 625 may be any of the materials previously described, which may be utilized within a battery cell. As will be explained in more detail below, by maintaining active material 625 within the second region 409 of current collector 405, fusing capabilities of the current collector may be utilized that facilitate containment of fault events within a specific region.

Depending on the cell type in which the current collector is utilized, the current collector may include active material on opposite sides of the current collector. For example, such as in various stacked or wound structures, active material 625 may be positioned on multiple sides of the current collector 405. FIG. 6B illustrates another embodiment in which electrode active material 625 is positioned on multiple surfaces of current collector 405. As shown, current collector 405 may include a polymer film 410 including a first surface 411 and a second surface 413. The polymeric material may be contacted along these surfaces with wires 415. A first plurality of wires 415*a* may be disposed along first surface 411, while a second plurality of wires 415*b* may be disposed along second surface 413. Active material 625*a* may be disposed along the first plurality of wires 415*a*, and active material 625*b* may be disposed along the second plurality of wires 415*b*.

FIG. 6C shows an elevation view or front view of the electrode illustrated in FIG. 6B. As illustrated, the electrode may include current collector 405, which may include polymer film 410, first plurality of wires 415*a*, and second plurality of wires 415*b*. The electrode may additionally include a first active material 625*a* and a second active material 625*b* disposed on opposite surfaces of current collector 405. FIG. 6C also illustrates the formation of active material about the plurality of wires 415. The electrode configuration may include the active material 625 extending within the current collector 405 and about the plurality of wires 415 to contact the polymer film 410. It is to be understood that as previously noted the figure is not necessarily drawn to scale, and is meant only to illustrate that the wires 415 may extend within the active material. Such a formation may provide additional surface area about the plurality of wires in contact with the active material to improve electronic distribution about the cell.

Figure 7A:
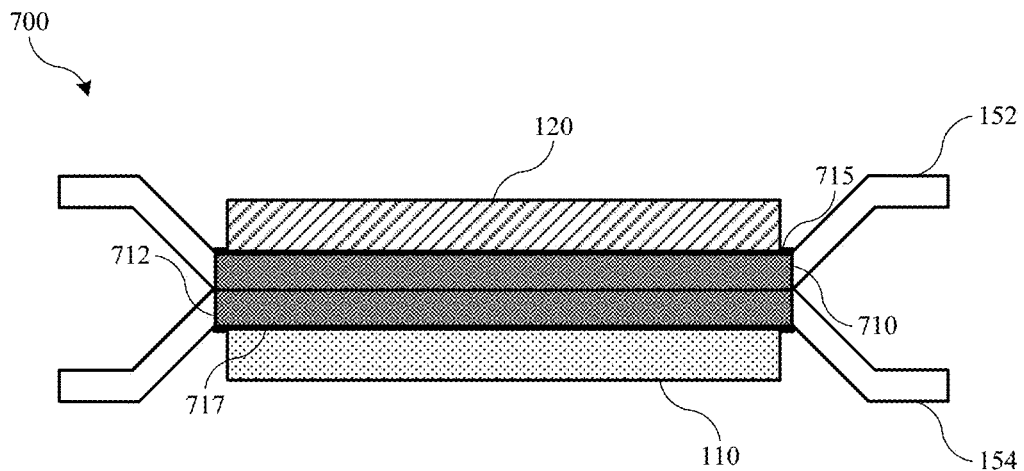
FIGS. 7A-7C show schematic views of battery cell components according to embodiments of the present technology.
Figure 7B:
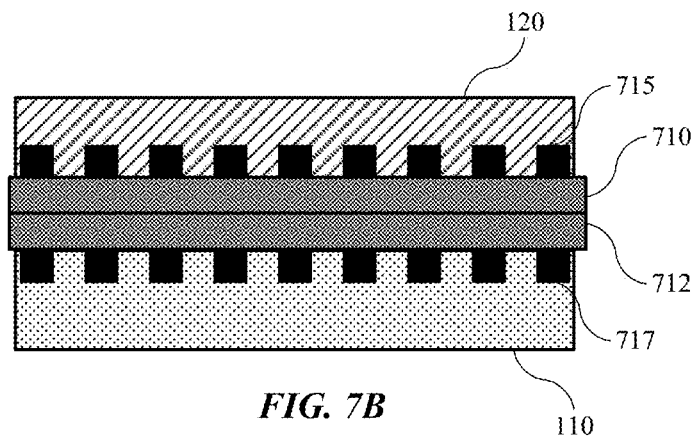
Figure 7C:
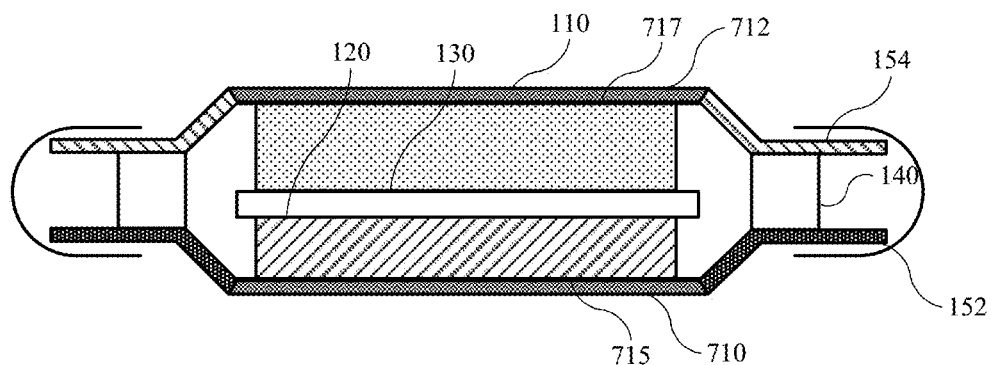

The configuration of current collectors according to the present technology may be based in part on the cell structure of the battery. For example, a stacked battery similar to those illustrated in FIG. 1 may not utilize the same configuration of a current collector as a battery cell in a wound configuration, which may include a cell structure as illustrated in FIG. 3. In other embodiments, similar current collectors may be used in each cell type noted. Turning to FIGS. 7A-7C are shown an exemplary electrode configuration 700 that may be used in certain stacked batteries such as those illustrated in FIG. 1. As illustrated in FIG. 7A, the electrode configuration 700 may include a first current collector 152. Current collector 152 may include a polymer film 710 coupled with a first plurality of wires 715. The first plurality of wires 715 may be a conductive material, or a metal-containing material, and may be disposed along a surface of the polymer film, and may be coupled with the polymer film. A first active material 120 may be coupled with the first current collector 152.

Electrode configuration 700 may additionally include a second current collector 154. In some embodiments second current collector 154 may be a metal foil, such as described previously with respect to FIG. 1. In other embodiments, such as illustrated, second current collector 154 may also include a current collector having a polymer film 712. Second current collector 154 may also include a second plurality of wires 717, which may be disposed along or coupled with the second polymer film 712. A second active material 110 may be disposed on or coupled with the second current collector 154.

Electrode configuration 700 may illustrate two joined electrodes as previously discussed with relation to FIG. 1, which may be electrodes of two coupled cells in a stacked arrangement. For example, current collector 152 and active material 120 may be associated with a first battery cell, and current collector 154 and active material 110 may be associated with a second battery cell. Although either current collector may be either battery cell electrode, current collector 152 may be an anode current collector having associated anode active material 120, and current collector 154 may be a cathode current collector having associated cathode active material 110. The two current collectors may be disposed proximate one another, and may be in direct contact or directly coupled with one another. The coupling may occur along surfaces of polymer films 710, 712, and may occur along surfaces opposite surfaces on which wires are disposed. For example, first current collector 152 may include polymer film 710. A first surface of polymer film 710 may be a surface along which the first plurality of wires 715 are disposed. A second surface of polymer film 710 may be opposite the first surface. Similarly, second current collector 154 may include polymer film 712. A first surface of polymer film 710 may be a surface along which the second plurality of wires 717 may be disposed. A second surface of polymer film 712 may be opposite the first surface. The second surface of polymer film 710 and the second surface of polymer film 712 may be adjacent one another in the stacked cell arrangement, and may be in direct contact. In some embodiments, the cells may be directly coupled along the second surfaces of polymer film 710 and polymer film 712.

FIG. 7B shows a cross-sectional view through current collector 152 and current collector 154 of FIG. 7A. As illustrated, the electrode configuration includes a first polymer film 710 and a second polymer film 712, which may be coupled with one another along a surface of each polymer film. In some embodiments a coupling material may be disposed between the two current collectors. In other embodiments, because the cells both include a polymeric material, the coupling may include a bonding or sealing, such as a heat seal, that couples the polymer films together. Polymer film 710 may have a first plurality of wires 715 disposed along a surface of the polymer film, and polymer film 712 may have a second plurality of wires 717 disposed along a surface of the polymer film. Additionally, a first active material 120 may be disposed in contact with the first plurality of wires 715, and a second active material 110 may be disposed in contact with the second plurality of wires 717. As previously discussed, the active material layers may extend about the plurality of wires, and may extend down to contact polymer films 710, 712.

FIG. 7C illustrates a single cell of a stacked battery arrangement similar to FIG. 1, which includes current collectors having polymer materials. As illustrated, the cell includes a first current collector 152, which may include a first polymer film 710 on which a plurality of wires 715 may be disposed. The plurality of wires 715 may be positioned along a surface of the polymer film 710 which faces second current collector 154. Second current collector 154 may include a metal foil, or as illustrated may include a second polymer film 712 on which a plurality of wires 717 may be disposed. The cell may be completed with a first active material 120, a second active material 110, and a separator 130 positioned between the two active material layers. As previously discussed, a seal 140 may be included between the two current collectors to hermetically seal the cell.

As previously described, the battery configuration discussed with respect to FIG. 1 may be characterized by a current flow in the z-direction through the battery cell. Accordingly, current flow from a first battery cell to a second battery cell may occur through the stacked arrangement instead of along an xy-direction and through tabs which may be coupled. The coupling of two cells may occur along two adjoining current collectors of two separate cells, such as illustrated in FIGS. 7A and 7B. Polymer films 710, 712 may not sufficiently conduct current through the material, as opposed to along the plurality of wires 715, 717 disposed along the polymer films. To address the current delivery through the cells in a z-direction, the polymer films 710, 712 may include a conductive material within the polymer matrix to enable or enhance conductivity through the polymer.

For example, a carbon material, a metal material, or another conductive material may be disposed within the matrix, which may be any of the conductive materials discussed elsewhere. Additionally, the polymer films 710, 712 may include similar or different materials, as well as different concentrations of materials in order to further tune conductivity within the cell. This conductive material may assist current flow from second plurality of wires 717 through polymer film 712 to then pass into the adjoining cell through polymer film 710 into the first plurality of wires 715, and on through the cells as previously discussed. The conductive material may be included in the polymer material to allow conductivity as previously explained, but may be limited to assist in fault events as will be further explained below. For current collectors as discussed with respect to FIG. 3, for example, where current may travel along an xy-plane of the cell, the polymer material may or may not include conductive material within the polymer matrix, and in some embodiments may be insulative. By utilizing an insulative material and distributing current along an xy-plane, the insulative material may assist during faults as will be explained below.

FIGS. 8A-8E show schematic current collector configurations according to embodiments of the present technology. Each figure includes an exemplary current collector including a polymer film 810 along which a plurality of wires 815 may be disposed. Each figure includes a first plurality of wires 815a and a second plurality of wires 815b, although it is to be understood that any of the illustrated configurations may include only a single plurality of wires. The different configurations may be included in any of the cells discussed elsewhere, and may illustrate exemplary arrangements and distributions utilized in various battery cells according to the present technology.

Figure 8A:
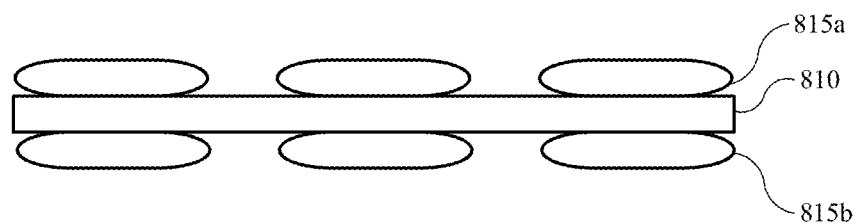
FIGS. 8A-8E show schematic electrode configurations according to embodiments of the present technology.
Figure 8B:
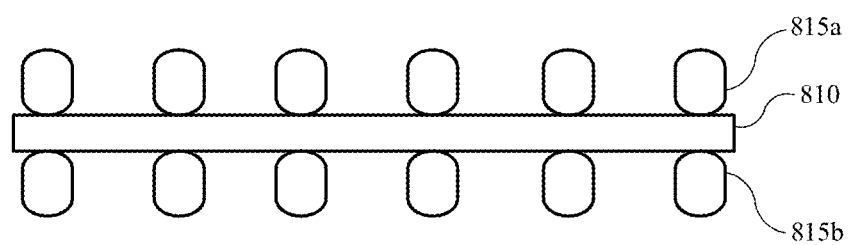

Current collectors may include wires 815 that have been adjusted to provide various effects within a cell. For example, depending on a variety of factors, more or less current may be required from one design over a different design. A cell in which a higher current is required may include thicker wires 815, such as illustrated in FIG. 8A or 8E, which may allow higher current to pass along the wire. Configurations such as illustrated in FIG. 8B, may enable fusing protection at lower currents based on thinner wires, for example. As current increases along a particular wire, heat may build within the element. The wire may be sized, shaped, or otherwise configured to maintain structural integrity within a range of current including a normal operating current window. The range may extend to cover fluctuations of current that may occur during normal operation, including higher charge or discharge operations, and may extend to a particular threshold at which the wire is intended to trip or fuse.

A threshold current, which may be a range as well, may be determined at which the wires are to trip, which may increase resistance or interrupt current flow through the current collector. This current may be associated with an amount of heat that may be generated based on properties of the wire, and the size, shape, and other geometric or thermal characteristics of the wire may be determined based on this threshold. In operation, once the threshold current is surpassed, the wires may fuse or break, at which point current is interrupted or reduced across or through the current collector, which may reduce the internal temperature and limit the effects of the fault event.

Figure 8C:
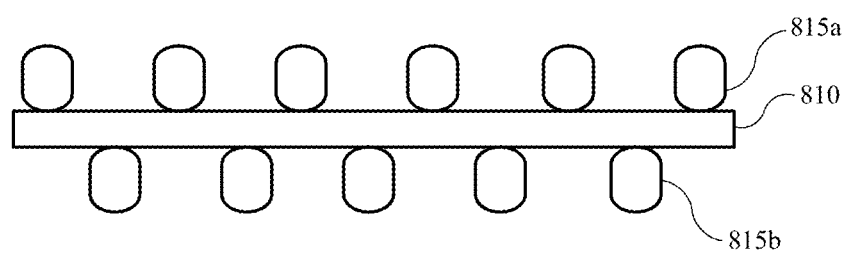
Figure 8D:
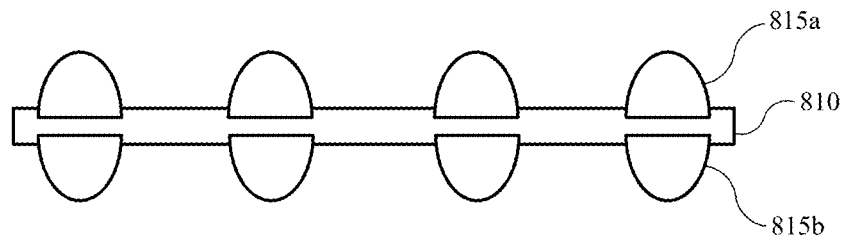
Figure 8E:
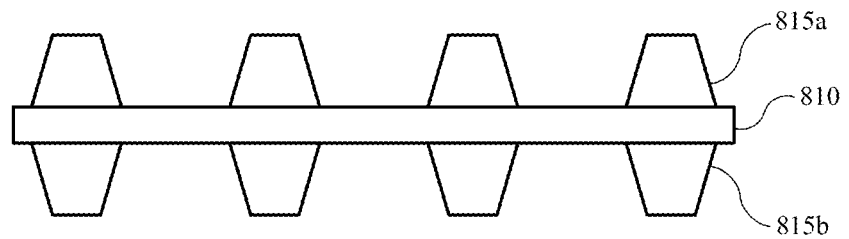

FIG. 8C illustrates a configuration in which the second plurality of wires 815b is laterally offset from the first plurality of wires 815a. Such a configuration may be utilized with any cell as previously described. In embodiments in which the polymer includes a conductive material, such as in stacked configurations with z-direction current transfer, for example, laterally offsetting the two plurality of wires 815 may improve uniformity of current density through the current collector. FIG. 8D illustrates a current collector configuration in which the polymer film 810 at least partially extends about the plurality of wires 815. The polymer film 810 may extend at least partially about either the first plurality of wires 815a or the second plurality of wires 815b. A calendaring or other pressure or deposition process may be performed in which the plurality of wires, or the material composing the wires, is forced within the polymer film. This may reduce the overall thickness of the current collector, which may enable a thinner battery design.

Wires 415 may be metal-containing material or may be other conductive materials, such as carbon-containing materials. In some embodiments wires 415 may be the same material as extension 420, or may be a different metal or conductive material, and may include any of the previously described metals including aluminum, copper, titanium, or other materials which may be utilized or may be stable at anode or cathode potentials. The wires may be formed by a printing or deposition process that affixes particles or lines of conductive material along the polymeric material. The wires may be formed to any dimension, thickness, or geometry based on characteristics determined for the battery cell as previously explained. For example, the wires may be characterized by a width of up to or greater than about 5 μm, and may be characterized by a width greater than or about 7 μm, greater than or about 10 μm, greater than or about 15 μm, greater than or about 20 μm, greater than or about 25 μm, greater than or about 30 μm, greater than or about 35 μm, greater than or about 40 μm, greater than or about 50 μm, greater than or about 60 μm, greater than or about 70 μm, greater than or about 80 μm, greater than or about 90 μm, greater than or about 100 μm, greater than or about 125 μm, greater than or about 150 μm, greater than or about 200 μm, or greater. A thickness of the wire may be less than or about 100 μm in embodiments, and may be less than or about 90 μm, less than or about 80 μm, less than or about 70 μm, less than or about 60 μm, less than or about 50 μm, less than or about 40 μm, less than or about 30 μm, less than or about 20 μm, less than or about 15 μm, less than or about 12 μm, less than or about 10 μm, less than or about 9 μm, less than or about 8 μm, less than or about 7 μm, less than or about 6 μm, less than or about 5 μm, less than or about 4 μm, less than or about 3 μm, less than or about 2 μm, less than or about 1 μm, or less. Additionally, the present technology and formation processes may enable the wires to be spaced from one another in a variety of ways.

For example, based on formation processes of the present technology, such as printing or deposition, the wires or filaments may be spaced from one another to produce a wire-to-wire distance of less than or about 10 μm. In embodiments, the spacing may also be greater than or about 20 μm, greater than or about 30 μm, greater than or about 40 μm, greater than or about 50 μm, greater than or about 60 μm, greater than or about 70 μm, greater than or about 80 μm, greater than or about 90 μm, greater than or about 100 μm, greater than or about 200 μm, greater than or about 500 μm, greater than or about 1000 μm, greater than or about 5 mm, or more depending on the size and configuration of the cell. For example, in embodiments in which the polymer film is less conductive, the wire-to-wire distance may be smaller, such as between about 20 µm and about 40 µm, which may maintain a fairly uniform current distribution and temperature across the current collector, and may more uniformly interact with the active material. However, in embodiments in which the polymer film is more conductive, such as in stacked configurations discussed previously, the spacing may be greater where the active material may extend about the wires to contact the polymer film as well. The wire-to-wire spacing in such configurations may be up to, about, or greater than the thickness of the active material layer, and may be characterized by a distance of any of the ranges discussed above.

Figure 9:
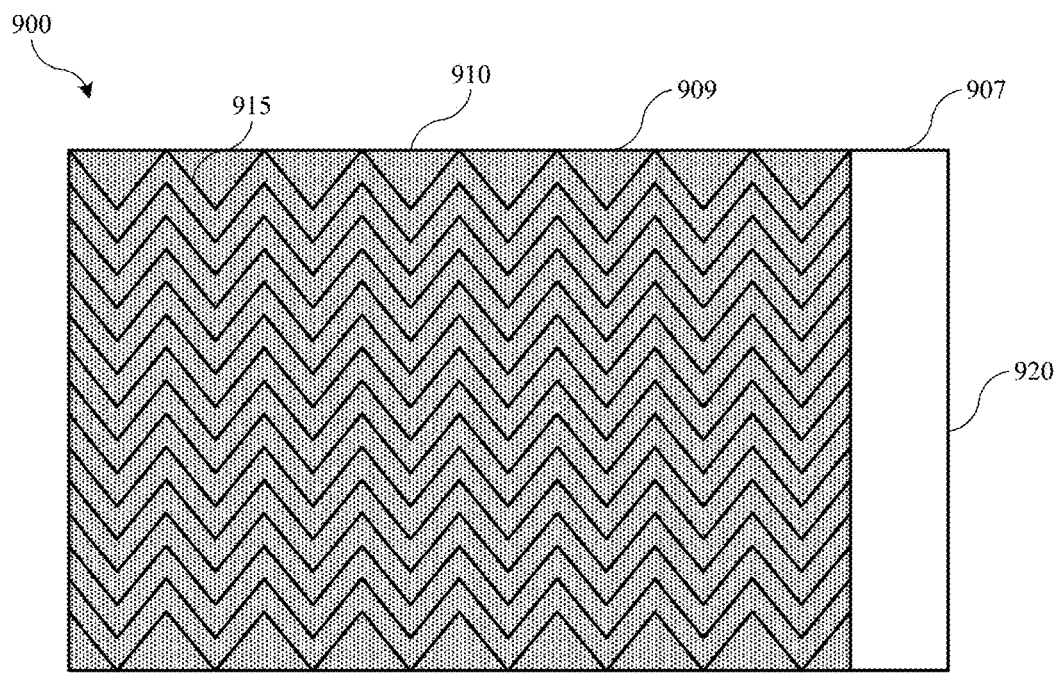
FIG. 9 shows a schematic plan view of an electrode according to embodiments of the present technology.

FIG. 9 shows a schematic top plan view of a current collector 900 according to embodiments of the present technology. Current collector 900 may be similar to any of the previously described current collectors. Current collector 900 may include a first region 907 and a second region 909. First region 907 may include an extension 920, which may be coupled with a plurality of wires 915. Second region 909 may include a polymer film 910 on which the plurality of wires may be disposed. The previous examples have illustrated linear wire profiles across the polymer film 910, along with a variety of geometries of the wires. Similar geometries may also be utilized in nonlinear profiles, such as waveforms including curved and square profiles, or other patterns including serpentine or zigzag as illustrated. By utilizing a nonlinear profile extending from the extension across the polymer film, the wires may be configured to account for particular manufacturing processes, for example.

Many battery cell manufacturing processes may include one or more calendaring or roller operations, which may bend, stretch, or otherwise shape the current collector. When the wires are sized within the dimensions previously discussed, certain materials that may be utilized may be more brittle, or less capable of maintaining integrity during manufacture. When in a linear configuration and a calendaring or other rolling operation is performed, the polymer film on which the wires are disposed may stretch longitudinally. This stretching may apply a tensile force to the wires, which may break in a linear formation. When a shaped profile such as illustrated or discussed is utilized, the tensile force may extend the profile in the direction of the force, but may not break the wires. This may provide a more robust design for certain manufacturing processes, which may be associated with one or more embodiments of the present technology.

Figure 10:
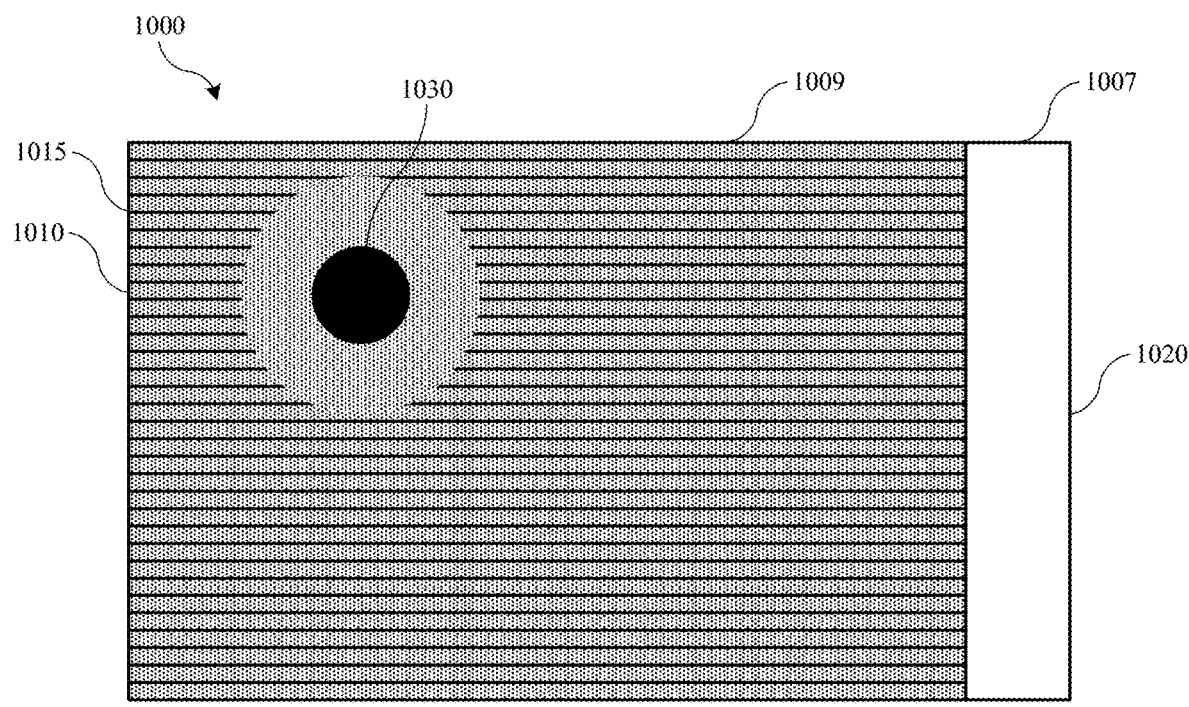
FIG. 10 shows a schematic plan view of an electrode according to embodiments of the present technology.

Turning to FIG. 10 is shown a current collector 1000 according to the present technology. Current collector 1000 may be similar to any of the previously described current collectors, and may illustrate a current collector within a battery cell that underwent a fault event. The current collector may be associated with additional components, such as active material layers, or other components previously described, but is illustrated to show aspects of current collectors according to the present technology. Current collector 1000 may include similar elements as described elsewhere, and may be characterized by a first region 1007 and a second region 1009. First region 1007 may include an extension 1020, which may be coupled with a plurality of wires 1015. A polymer film 1010 may be contained within the second region 1009, and the plurality of wires 1015 may be overlying or contacting the polymer film 1010.

FIG. 10 may illustrate a particular fault in which a conductive foreign object 1030 has penetrated the battery cell in which current collector 1000 is housed. The foreign object 1030 may have penetrated through a separator and an additional current collector operating at a different potential than current collector 1000, which may cause an electrical short through the cell. During an electrical short, current may travel though one or more cells to the site of the short, which may generate heat and exothermic reactions within the battery. The present technology may be configured to limit or interrupt the current flow along the plurality of wires, which may exceed a threshold current associated with the wires.

As explained previously, the wires may be sized or shaped to distribute current up to a threshold level which may fuse or break the wires. As shown in FIG. 10, the current flow along wires 1015 leading to the site of the short may exceed the threshold of the wires. The wires along which current is flowing towards the short may then exceed their threshold design current capacity and fuse or break about the site of the short. When this occurs, current may no longer reach the conductive foreign object 1030, which may be bridging a positive and negative current collector, and the short may be halted or slowed. For example, in stacked configurations in which the current is intended to transfer in the z-direction through the cell, the polymer film 1010 may still conduct current subsequent fusing of the wires 1015 about the site of the short. However, the polymer film 1010 may be less conductive than the wires, and may be characterized by the resistivity ranges discussed previously, which may be high enough to limit heat generation within the cell. Accordingly, although in these configurations current may still travel to the site of the short until the battery capacity has been depleted, the rate of distribution may be below amounts that may otherwise deteriorate the cell.

Figure 11:
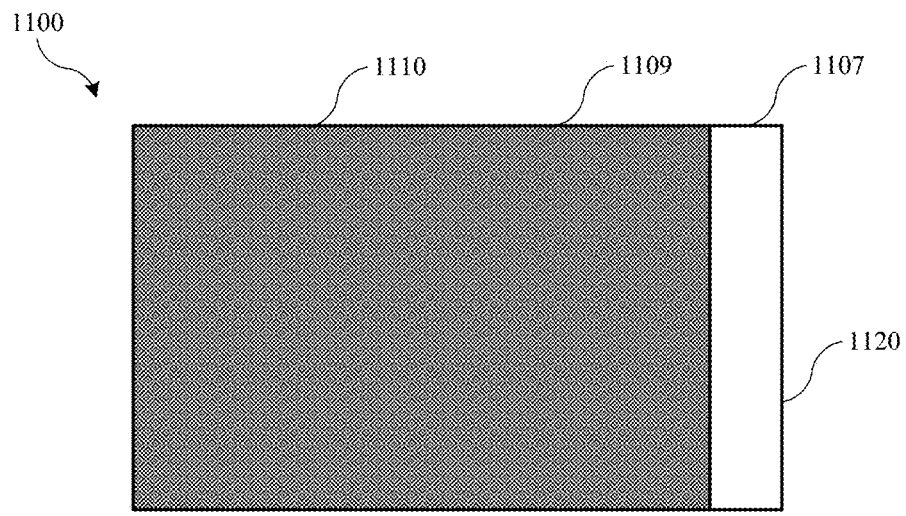
FIG. 11 shows a schematic plan view of an electrode according to embodiments of the present technology.

FIG. 11 illustrates an additional current collector 1100 according to the present technology. Current collector 1100 may be similar to current collectors described previously in one or more aspects. For example, current collector 1100 may include a first region 1107 and a second region 1109, although in some embodiments the current collector 1100 may only include second region 1109. The first region may include an extension 1120, which may include a conductive material as previously discussed. The second region 1110 may include a polymer film, which may be associated with conductive particles. The conductive particles may also be contained within the second region 1109 of the current collector.

Figure 12:
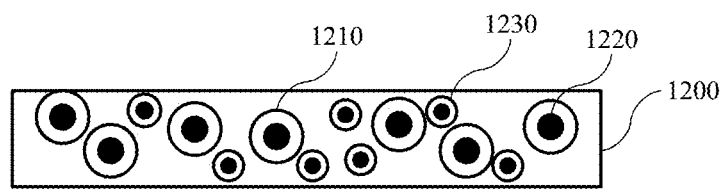
FIG. 12 shows schematic side view of an electrode according to embodiments of the present technology.

Turning to FIG. 12 is shown an example of a polymer film 1200 according to the present technology. The polymer film 1200 may include conductive particles 1210 associated with the polymer film. As illustrated in FIG. 12, the conductive particles 1210 may be contained within the polymer film 1200 to provide an amount of conductivity within the polymer. In some embodiments, the polymer film 1200 may include wires as previously discussed. In other embodiments the polymer film 1200 may include conductive particles that operate to restrict or interrupt conductivity of the polymer film, which may operate as the current collector of the technology.

The conductive particles may be included within the polymer film to provide an amount of conductivity to enable operation of the polymer film as a current collector. The conductive particles 1210 may include a core 1220 and a shell 1230 in embodiments, and the particles may be characterized by a size and shape that is uniform throughout the polymer film, or is variable, such as with varying diameter as illustrated. The core 1220 of the conductive particles may be a polymer core, and may be any of the polymers previously discussed. By utilizing a polymer core, the particle weight may be reduced in comparison to solid metal particles. The shell 1230 may be any of the metals or conductive materials previously discussed, and may be a continuous or discontinuous shell about the core 1220. For example, the shell may be particles, flakes, or other amounts of the conductive material, which may completely or partially encapsulate the core 1220. As illustrated, the particles may be uniformly distributed within the polymer film in embodiments to provide a tuned conductivity to the polymer film, which may be based on characteristics of the cell.

Figure 13:
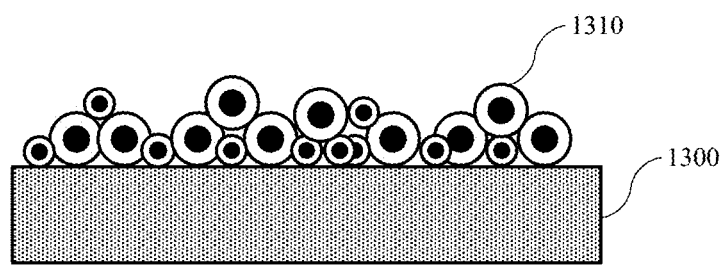
FIG. 13 shows schematic side view of an electrode according to embodiments of the present technology.

FIG. 13 illustrates an additional configuration of a polymer film 1300 that includes conductive particles 1310 associated with the polymer film. The conductive particles may be similar to those discussed above with FIG. 12, but may be deposited along one or more surfaces of the polymer film. The conductive particles may be deposited in filaments or wires along a surface of the polymer film in any of the patterns or distributions discussed previously. Where polymer film 1200 may include conductive material within the film, polymer film 1300 may include the particles on surfaces of the film. Accordingly, in some embodiments, polymer film 1300 may also include conductive particles as previously described within the polymer film to provide a level of conductivity through the polymer film. For example, when utilized in stacked cells as previously described, the polymer film may include a conductive material within the film in addition to the conductive particles disposed on a surface of the polymer film in order to provide a z-direction conductivity through the film.

Either incorporated within the polymer film or deposited along the polymer film, the conductive particles may operate to provide conductivity during normal operation. Additionally, under fault conditions, the polymer core within the conductive particles, may be configured to melt and diffuse the metal or conductive material composing the shell. Such an operation may produce a discontinuous distribution of metal or conductive material, which may reduce, limit, or halt current distribution through or across the polymer film or current collector.

Additionally, the core of the conductive particles may be or include a positive temperature coefficient ("PTC") material as the core or within the core. The PTC material may include a polymer that is itself conductive at low temperature, but which becomes highly resistive at increased temperature. The material may be included with the metal shell to be non-resettable in embodiments, unlike conventional PTC materials. The PTC material may include one or more materials in the design that provide conductive properties under normal operating conditions, while providing a current interruption at fault conditions. For example, the PTC material may include a polymer material as well as a binder material. The polymer may include a long-chain polymer, including polyethylene or polypropylene, for example. The binder may include an acrylate or an acetate, such as poly(methyl methacrylate), or poly(vinyl acetate).

In embodiments, the PTC material may be designed and made to function with low impedance at normal operating conditions of a battery cell, and may be designed to function at high impedance at a determined temperature exceeding normal operating conditions of the cell. When temperatures exceed a threshold fault temperature for the current collector, the PTC material may be configured to swell, which may separate the conductive carbon of the polymer. This action alone may cause the impedance across the PTC layer to increase prohibitively and interrupt the current flow by separating the metal shell, or producing discontinuity in the metal shells across particles forming a profile across the polymer material.

For example, under normal operating temperatures, the PTC material may impart an impedance of less than or about 1 milliohm, less than or about 0.1 milliohms, less than or about 0.01 milliohms, or between about 0.001 milliohms and about 0.1 milliohms. As the temperature exceeds acceptable limits of the normal operating window, the PTC material may provide an increased impedance as the structure of the PTC layer adjusts due to the increased temperature. For example, the impedance may increase to more than or about 1 megaohm, more than or about 5 megaohms, more than or about 10 megaohms, more than or about 20 megaohms, or more than or about 50 megaohms by separating the conductive materials, such as carbon, within the structure of the material.

The PTC material may include additional materials in addition to the polymeric materials discussed. For example, the polymeric materials may provide a structure that incorporates and contains additional conductive material mixed with the binder or polymer of the PTC material. The conductive material may aid operation of the conductive path during normal operation. For example, the conductive material may include a powder of conductive material that is mixed with the polymeric structure, and may include any of the conductive materials previously described. By utilizing either polymeric or PTC materials that may operate to melt and diffuse or separate or reduce the conductive pathways through or across the current collector, the current collectors may limit propagation of fault events similar to the other designs discussed through the disclosure.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery cell electrode comprising:
a current collector including a polymer film coupled with a plurality of wires of a conductive material, wherein:
the current collector comprises a first region and a second region;
the first region is characterized by an extension of the conductive material;
the polymer film is contained within the second region of the current collector;
the plurality of wires comprise a first plurality of wires extending across a first surface of the polymer film and a second plurality of wires extending across a second surface of the polymer film opposite the first surface of the polymer film; and
the first plurality of wires and the second plurality of wires extend from the extension of the conductive material along the polymer film.

2. The battery cell electrode of claim 1, wherein the polymer film is at least partially contained between the first plurality of wires and the second plurality of wires.

3. The battery cell electrode of claim 1, wherein the polymer film at least partially extends about the plurality of wires.

4. The battery cell electrode of claim 1, wherein the polymer film comprises a conductive polymer film.

5. The battery cell electrode of claim 1, further comprising an electrode active material positioned along the plurality of wires within the second region of the current collector.

6. The battery cell electrode of claim 5, wherein the electrode active material at least partially extends within the plurality of wires to contact the polymer film.

7. The battery cell electrode of claim 5, wherein an inter-wire distance is less than or equal to a thickness of the active material.

8. The battery cell electrode of claim 1, wherein each wire of the plurality of wires is characterized by a nonlinear profile from the extension of the conductive material along the polymer film.

9. A battery comprising:
a first current collector including a polymer film coupled with a plurality of wires of a metal-containing material, wherein:
the current collector comprises a first region and a second region;
the first region is characterized by an extension of the metal-containing material;
the polymer film is contained within the second region of the current collector;
the plurality of wires comprise a first plurality of wires extending across a first surface of the polymer film and a second plurality of wires extending across a second surface of the polymer film opposite the first surface of the polymer film; and
the first plurality of wires and the second plurality of wires extend from the extension of the metal-containing material along the polymer film;
a first active material coupled with the first current collector;
a second current collector; and
a second active material coupled with the second current collector.

10. The battery of claim 9, wherein the second current collector comprises a metal foil.

11. The battery of claim 9, wherein the first current collector and the second current collector comprise components of a first battery cell within the battery, and wherein the battery further comprises a second battery cell including:
a third current collector proximate the first current collector.

12. The battery cell electrode of claim 9, wherein the polymer film is at least partially contained between the first plurality of wires and the second plurality of wires.

13. The battery cell electrode of claim 9, wherein the polymer film at least partially extends about the plurality of wires.

14. The battery cell electrode of claim 9, wherein the polymer film comprises a conductive polymer film.

15. The battery cell electrode of claim 9, further comprising an electrode active material positioned along the plurality of wires within the second region of the current collector.

16. The battery cell electrode of claim 15, wherein the electrode active material at least partially extends within the plurality of wires to contact the polymer film.

17. The battery cell electrode of claim 15, wherein an inter-wire distance is less than or equal to a thickness of the active material.

18. The battery cell electrode of claim 9, wherein each wire of the plurality of wires is characterized by a nonlinear profile from the extension of the conductive material along the polymer film.

* * * * *